2,833,652

METHOD OF MECHANICALLY SEPARATING LUPULIN FROM HOPS

Winifred A. Naatz, Milwaukee, Wis.

No Drawing. Application September 15, 1954
Serial No. 456,325

4 Claims. (Cl. 99—50.5)

The instant invention relates to the treatment of hops to obtain lupulin therefrom, and more particularly, to an improved method for obtaining lupulin from hops which involves freezing the hops.

In the manufacture of beer or ale, the important raw materials include malt, corn or rice, water, yeast and hops. Hops are the female flowers (called cones or strobiles) of the hop vine (*Humulus lupulus*). Although a number of different procedures have been suggested for the handling of hops, all of these leave something to be desired. In general, the hops are harvested to a substantial extent on the west coast and must be put in condition suitable for at least temporary storage during transportation to the central and eastern parts of the United States. At the brewery, the hop cones must be treated to extract the lupulin therefrom. The usual procedure involves harvesting the cones, then drying the same and cooling and baling the cones for shipment. The cones thus prepared are shipped to the brewery and there they are boiled in their entirety in the sugary wort in order to extract the necessary resins and aromatic oils therefrom. This boiling procedure is more or less of a "cut and try" procedure which individual brew masters may develop and it is difficult to efficiently control because of variations in the hop composition, etc. Also, the harvested cones or "fresh" cones contain a rather substantial quantity of water (i. e., about 40 to 50%) which must be substantially removed as quickly as possible because the presence of water causes deterioration of the lupulin. Also, the lupulin is readily subjected to oxidation attack and the drying conditions must be carefully controlled to avoid this difficulty.

It has also been found that the hop seeds have a distinct taste as well as other nuisance effect, so the boiling of the whole cone, which is the procedure now used, must be used with hops which are seed-free or at least have a minimum of seeds. This involves keeping the male hop plants away from the vines so as to obtain seedless growth; and this type of growth does not give the best growth conditions. Hops with seeds tend to mature better and have higher lupulin content and higher quality lupulin than seedless hops.

The ordinary drying procedures at the hop ranch (or at the hop vine location) involve the reduction of moisture content in the hops to about 9 weight percent. Only about 17 weight percent of the market hops thus obtained is material useful to the brewer. The remaining material includes the leaves, stems, petals and similar plant tissue. During hop ripening, tiny "cups" form inside the cone, on its stem and on the inner face surface of its petals. As these cups or glands are formed and become enlarged, they are filled with an oily resinous exudate, which enters the cups through their points of contact with the inner base surface of the petals and fills the cup. At harvest time, these tiny "sub-cone" shaped cellulose cups, which are open at their free end, are brim full of the oils and resins comprising the resinous exudate. The resinous material therein is known as lupulin (and the cup-glands filled with this resinous material are known as the lupulin glands). The lupulin is understood to contain a relatively small amount of moisture and consists essentially of several resins, resin bitter, and some eight aromatic (volatile) oils. The principal moisture content of the hops is believed to be in the petals and stems. At the ranch, the drying of the entire hop cone is ordinarily carried out using an air blast at about 130° F., but this must be accomplished relatively quickly or excessive oxidation of the lupulin will take place. Once the hop cones have been dried, they are stored in sealed containers (preferably in an inert atmosphere) so as to avoid any further oxidation of the lupulin.

Although the difficulties encountered in the art have been appreciated for some time, these have been recognized as difficulties which could not be avoided and there have been few if any changes in the procedures employed for the handling of hops.

The instant invention is based upon an entirely novel approach to the extraction of lupulin from hops. It avoids substantially the entire problem of handling hops for storage and transportation and it further avoids the difficulties and uncertainties encountered in the boiling of the whole cone at the brewery. The instant invention is based upon the discovery that lupulin to a substantially complete extent may be obtained from hops, if the hops are first frozen and then shaken so as to free the frozen lupulin particles. It has been found that freezing of the hops tends to reduce the resinous lupulin to a non-adherent solid particulate form (something in the neighborhood of one-half millimeter in maximum particle dimension) which may be shaken free from the frozen hop with relative ease by procedures which do not involve appreciable particle size reduction of the remaining hop components and the minute frozen lupulin particles thus shaken free may be readily separated from the remainder of the hops by fine screens or similar separating devices. The lupulin thus obtained is obtained in the substantial absence of the bulk of cellulosic tissue of the hop and storage, transportation, and the like problems are greatly simplified. Furthermore, the lupulin is obtained in greater purity than heretofore obtainable, since it may be obtained free from various water-soluble ingredients which might otherwise be present in the stem, petals, or even seeds which may be present in the full cone.

It is, therefore, an important object of the instant invention to provide an improved method of obtaining lupulin from hops.

Still another object of the instant invention is to provide an improved simplified method for the separation of lupulin from hops at the ranch or vine location, thereby to facilitate storage, transportation, etc.

It is a further object of the instant invention to provide an improved method of obtaining lupulin in the substantial absence of the bulk of the moisture content of the hop cone.

Other and further objects, features and advantages of the present invention will become apparent to those skilled in the art from the following detailed disclosure of preferred embodiments thereof.

The invention consists in an improved method of obtaining lupulin from hops which comprises freezing the hops, then shaking the frozen hops to free frozen lupulin particles therefrom and separating the frozen lupulin particles from the remainder of the frozen hops.

The general details of normal harvesting of hops are well known in the art and need not be discussed herein other than generally. In the normal harvesting procedure, the fresh hops are ripened on the vines and picked, sorted, grated, etc. in order to obtain batches of "fresh" hops which at this stage contain some 40 to 50 weight percent of water. In this condition, the hops spoil readily and the usual procedure is to dry the hops, for example, in an air blast at about 130° F. This accomplishes substantial dehydration of the hops (actually reducing the water content to about 9 weight percent) and the hops are then in condition for storage.

In the practice of the instant invention, the hops used may be either "fresh" hops or "dehydrated" hops; that is, the hops may be used either before or after the initial customary drying step. There is an advantage in carrying out initial drying of the hops, because the lupulin ultimately recovered in the instant process will then be substantially free from moisture and will thus be much more stable during storage. On the other hand, the initial drying procedure for hops is, of course, well known and the equipment is ordinarily available at ranches for this purpose (so that the problems here involved are now readily understood in the industry), but the advantages resulting from this are in most cases more than counter-balanced by the economic advantages which may result from carrying out initial freezing of the fresh hops. By freezing the fresh hops and effecting separation of the frozen lupulin therefrom, it is possible to separate the lupulin from the great bulk of the moisture which is ordinarily retained in the petal and stem tissue, before any drying operation is employed. The drying operation of the separated lupulin obtained in the instant process involves the removal of only minute amounts of water and the substantially smaller bulk of material (lupulin) to be handled by this procedure greatly simplifies the overall procedure and, particularly, the control of the drying operation. Drying techniques other than hot air (i. e., vacuum evaporation) may be used economically in this situation. For best storage properties, even the substantially water-free lupulin obtained by carrying out the instant process should be subjected to further drying conditions in order to remove the maximum amount of moisture without causing any harmful effects in the lupulin per se. In general, storage grade lupulin should have the moisture content therein reduced at least to about 1% and preferably to about 0.5%; and this can be accomplished in the practice of the instant invention by carrying out the ordinary initial drying of the fresh hops followed by the instant freezing and separating steps and/or by freezing and separating the lupulin from fresh hops, followed by a dehydration operation. (As used herein, the terms "parts" and "percent" mean parts and percent by weight unless otherwise specified.)

The freezing step employed in the practice of the instant invention is thus employed using either fresh (wet) hops or dehydrated (market dry) hops. As will be appreciated, the temperature to which the hops must be reduced during the freezing operation is merely that temperature which effectively solidifies all of the hop components including, of course, the moisture retained in the various hop elements. This moisture will freeze at approximately 32° F., but the resinous materials and volatile oils which form a part of the lupulin may freeze to form rigid non-adherent solid bodies at slightly lower temperatures of perhaps 10 to 15° F. For most practical purposes, the hops are frozen to a temperature within the approximate range of 0° F. to minus 80° F. Even colder temperatures may be used and, in fact, the separation is accomplished with greater ease as the operating temperature is decreased; but the use of even lower temperatures in most instances may not be practical from an economic point of view.

The freezing of the hops may be accomplished merely by a typical "deep freeze" technique whereby the hops are frozen in air or a similar inert atmosphere in a chamber suitably equipped for refrigeration. The hops may also be frozen by immersion in a suitably cold fluid medium such as liquid air or liquid carbon dioxide. The cold fluid medium to which the hops are exposed must, of course, be inert chemically as well as physically with respect to the hops and particularly the lupulin. In other words, the cooling medium must not effect a chemical reaction which would in any way alter the properties of the lupulin or introduce undesirable by-products into the lupulin component. Also, the freezing medium must not be an effective solvent for the lupulin component under the conditions here involved. The freezing medium may be a solvent (or even reactant) with respect to water to the extent that it would remove moisture from the hop components, and in this respect carbon dioxide has certain advantages. As a practical matter, ordinary refrigeration conditions have a number of other advantages, however, since such conditions avoid the necessity of handling special atmospheres, etc. and generally simplify the subsequent separating step.

Once the hops are frozen (i. e., completely frozen throughout), the normally resinous or plastic lupulin with volatile oils retained therein has been converted to a substantially non-adherent solid. The tacky resinous character of the lupulin is lost and unlike many plastic or liquid viscous materials which tend to adhere to their container when frozen, the resins of the lupulin become substantially non-adherent to any surfaces with which they come in contact. Although the precise phenomena here involved are not fully understood, and without attempting to limit the instant invention to any particular theory, it should be mentioned that it is believed now that the freezing of the lupulin involves rather substantial size change (either by contraction or expansion) such that the lupulin tends to free itself from the cellulosic tissue which retains the same in its resinous form. Whatever the particular phenomena here involved, the frozen solid lupulin may be shaken free from the body of the hop without an appreciable amount of difficulty. The normal rather careful handling that would be expected for use with frozen hops to prevent breakage of the brittle leaves and petals would not ordinarily be sufficient to shake the lupulin loose, mainly because the individual lupulin particles must travel at least a slight distance in escaping from the bulk of the hop body. On the other hand, actual grinding of the hops would result in the formation of petal and stem particle sizes that are substantially the same as the minute lupulin particle sizes in view of the extreme brittleness of the petal and stem tissue when frozen. The instant invention thus contemplates treatment of the frozen hops which is best described as the shaking of the frozen hops until the frozen lupulin particles have actually fallen free from the hop body. Most preferably, this operation is carried out on a shaker screen or apparatus whereon the hops may be gently tumbled and agitated, although not appreciably broken down in particle size, to the extent necessary to free the frozen lupulin particles therefrom.

The freeing of the frozen lupulin particles is thus preferably carried out by shaking a relatively thin layer or bed of frozen hops to the extent necessary to permit the frozen lupulin particles to shake free from the body of the frozen hops and to drop downwardly through a perforate bottom retaining wall for the thin layer of hops. Since a certain amount of breakdown of the leaf, stem and gland portions of the remainder of the frozen hops must take place, it has been found advisable as a practical matter to employ a series of shaker screens. The coarser screen being employed for the purpose of retaining the bulk of the large leaf and stem portions and successively finer screens being employed to separate the partially broken down leaf and stem portions from the relatively smaller lupulin particles. A final product screen is also provided preferably for the purpose of retaining the substantially all lupulin particles and permitting dust and similar even more minute waste particles to pass therethrough.

The separating operation is preferably carried out in the presence of the same or a similar cooling medium as is used in carrying out the initial freezing operation, although the essential feature of the separating operation is merely the mechanical separation of the lupulin particles from the remainder of the hops, while all of these portions or components are frozen. Accordingly, freezing of the hops to an extremely low temperature may be followed by a screening operation at ordinary temperatures which is carried out sufficiently rapidly to accomplish the necessary separation before the various hop components can fall out. The separating step is thus carried out while the lupulin and remaining hop portions are frozen and preferably, but not necessarily, under freezing conditions. In commercial embodiments of plants practicing the instant invention, the shaker screens are thus to be mounted in rooms subjected to refrigeration conditions, which are not necessarily as cold as the initial freezing room but which are sufficiently cool to permit the separation of the lupulin particles before thawing out of the hops can take place.

As a typical demonstration of the instant invention, a charge of fresh (wet) hops is frozen in a deep freeze unit to a temperature of about minus 20° F. and, while still in the frozen state, shaken on superimposed screens in order to obtain fractions A, B, C and D as indicated in the table below:

| Screen | Amount of Sample, percent | Volatile Comp., percent | Ether Extract | |
|---|---|---|---|---|
| | | | Undried, percent | Dried, percent |
| (A) On 12 mesh | 10 | | | |
| (B) Thru 12 mesh On 50 mesh | 50 | 18.2 | 6.05 | 7.39 |
| (C) Thru 50 mesh On 100 mesh | 20 | 63.3 | 11.7 | 31.9 |
| (D) Thru 100 mesh On 200 mesh | 20 | 53.6 | 42.4 | 91.4 |

It will be noted that fraction A comprises primarily stems and large petals; Fraction B includes broken down petals and leaves with only a relatively small volatile component which consists primarily of moisture. The bulk of the moisture is retained as ice with the stems in fraction A. It will be noted that the resin content of undried fraction B is only slightly lower than the resin content of the dried fraction and in each case the resin contents indicate that only a very small amount of lupulin is present in fraction B. In contrast, the fraction C contains a relatively substantial amount of lupulin; but fraction C contains an appreciable amount of broken leaves, etc. which contain an appreciable proportion of moisture, so that the moisture plus the volatile oils (which form the volatile component) is rather high in fraction C. Fraction D in the dried form consists almost entirely of lupulin and in the undried form comprises lupulin plus some moisture and some volatile oils (that are ordinarily lost during the prior art drying step). The amount of moisture which is included in fraction D depends to some extent upon the details of the shaking operation, which may be controlled so as to minimize the breakdown of ice particles to permit the same to be included within the high lupulin fraction, fraction D. For this reason, it may often be preferable to freeze fresh hops for use in the instant method and carry out the necessary dehydration after the separating or screening step has been carried out. Other separating steps may also be used, such as steps which involve the use of an inert cooling liquid wherein the cellulosic constituents of the hops may tend to float whereas the lupulin component would tend to sink. Most preferably, screening is carried out in a gaseous atmosphere, usually air.

If initial drying is to be carried out, the fresh hops sample is subjected to a hot air blast at about 130° F., at a temperature insufficient to cause appreciable oxidation of the lupulin component during a short drying time and at a temperature that is sufficient to effect relatively short drying times, until the hops have a moisture content reduced to at least about 9%. This is the standard drying operation and it may be used in preparing hops for use in the instant process. After such drying, the hops are frozen and the above indicated procedure is carried out. The results obtained indicate the absence of the moisture, but are otherwise similar to those shown in the table above. The fractions in each case represent approximately the same proportion of the sample and the ether extract (i. e., resinous component) in each of the fractions is only slightly less than that indicated for the dried fraction in the above identified table (presumably because of a slight breakdown of ice particles which will add a certain amount of moisture to the fractions B, C and D). In such case, the fraction D has a resinous content of about 85%, which can be increased to 90+% by carrying out a subsequent drying operation. The drying operation of the lupulin fractions (such as the fractions C and D) may be carried out by using substantially the same conditions as are currently in use in the drying of hops per se. The use of the hot air blast at about 130° F. (or within the range of about 90° F. to about 140° F.) serves adequately to carry out the necessary drying and the drying is, in fact, carried out substantially more rapidly than it can be carried out using the whole hop per se. Preferably, the moisture content in the fraction D is reduced to the extent hereinbefore indicated necessary to obtain storage grade lupulin. The fraction D contains lupulin in concentrated form (plus the essential oils retained therein) so that this lupulin may be used directly in the brewing art, or in the medicinal arts, without further treatment.

The fraction C, which contains an appreciable amount of lupulin plus a rather substantial amount of leaves, etc., may be reprocessed or used in some other process requiring a relatively high lupulin content or it may also be used in the brewing industry, since it has, in effect, had the lupulin concentration therein approximately doubled; and the use of the fraction C also effects a saving and simplification in storage and handling problems. Fraction B may also be used as a source of lupulin or it may be used as a fertilizer for the hop vines.

It will thus be seen that a high lupulin fraction may be obtained in the instant process by freezing and then "shaker-screening" the frozen hops to recover a fraction between about a 50 mesh screen and about a 200 mesh screen (i. e., at least small enough to pass a 50 mesh screen but too large to pass a 200 mesh screen), and preferably the fraction is the 100–200 mesh fraction D hereinbefore described.

It will be understood that modifications and variations may be effected without departing from the scope of the novel concepts of the present invention.

I claim as my invention:

1. A method of obtaining lupulin from fresh hops which comprises freezing the hops, then shaking the frozen hops to free frozen lupulin particles therefrom and separating the frozen lupulin particles from the remainder of the frozen hops and dehydrating the lupulin particles.

2. A method of obtaining lupulin from hops which comprises freezing the hops, then gently tumbling and agitating the frozen hops on a screen to an extent sufficient to free frozen lupulin particles therefrom but insufficient to cause appreciable breakdown of the leaf, stem and gland portions of the remainder of the hops, said screen being fine enough to retain thereon the remainder portions of the hops and coarse enough to pass the freed frozen lupulin particles, and then recovering and dehydrating the lupulin passing through the screen.

3. A method of obtaining substantially dry lupulin from hops which comprises freezing the hops to convert the lupulin therein to rigid non-adherent lupulin particles, shaking the frozen hops over a screen coarse enough to pass the frozen lupulin particles freed from the hops by such shaking and fine eough to retain the remainder of the hops as well as any moisture originally therein in the form of ice, and recovering said frozen lupulin particles passing through said screen.

4. A method of obtaining substantially dry lupulin from hops which comprises freezing the hops to convert the lupulin therein to rigid non-adherent lupulin particles, mechanically breaking down the frozen hops into very small frozen lupulin particles and relatively large frozen petal and stem particles with moisture originally present in the hops adhering to the petal and stem particles in the form of ice, and recovering the frozen lupulin particles from the remaining frozen particles.

References Cited in the file of this patent

UNITED STATES PATENTS

| | | |
|---|---|---|
| 92,934 | Brainard | July 27, 1869 |
| 338,027 | Boule | Mar. 16, 1886 |
| 718,253 | Hobson | Jan. 13, 1903 |
| 995,822 | Wallerstein | June 20, 1911 |
| 2,473,395 | Segal | June 14, 1949 |